United States Patent
Youn

(10) Patent No.: US 7,257,068 B2
(45) Date of Patent: Aug. 14, 2007

(54) APPARATUS AND METHOD FOR REPRODUCING REPLACEMENT DATA RECORDED ON A DISC

(75) Inventor: Jeong Chae Youn, Pyungtaek-si (KR)

(73) Assignee: Hitachi-LG Data Storage Korea Inc., Seoul (KR)

( * ) Notice: Subject to any disclaimer, the term of this patent is extended or adjusted under 35 U.S.C. 154(b) by 645 days.

(21) Appl. No.: 10/760,538

(22) Filed: Jan. 21, 2004

(65) Prior Publication Data

US 2004/0218487 A1 Nov. 4, 2004

(30) Foreign Application Priority Data

Jan. 22, 2003 (KR) .................... 10-2003-0004395

(51) Int. Cl.
*G11B 5/09* (2006.01)
(52) U.S. Cl. ................ 369/53.17; 369/53.15; 369/53.2; 369/47.14
(58) Field of Classification Search .............. None
See application file for complete search history.

(56) References Cited

U.S. PATENT DOCUMENTS 6,922,802 B2* 7/2005 Kim et al. .................. 714/723
2005/0022053 A1* 1/2005 Park et al. .................... 714/7

* cited by examiner

Primary Examiner—Muhammad Edun
(74) Attorney, Agent, or Firm—Ked & Associates, LLP

(57) ABSTRACT

An apparatus and method are provided for reproducing replacement data recorded in a spare area of a disc, such as a DVD-RAM. The replacement data is temporarily stored in a memory provided in a disc reading or player apparatus or a RAM provided in a PC connected to the disc reading or player apparatus so that the temporarily stored data can be read without movement of an optical pickup to the spare area during a subsequent data reproducing operation. The replacement data is thereby reproduced along with data recorded in a data area of the disc, in a successive manner. Accordingly, it is possible, for example, to efficiently prevent reproduced pictures from being discontinuously outputted due to a delayed data reading operation caused by a searching operation for the spare area in which the replacement data is recorded.

25 Claims, 5 Drawing Sheets

APPARATUS AND METHOD FOR REPRODUCING REPLACEMENT DATA RECORDED ON A DISC

BACKGROUND OF THE INVENTION

1. Field of the Invention

The invention relates to an apparatus and method for reproducing replacement data recorded on a disc.

2. Background of the Related Art

Recently, rewritable discs have been developed, for example, DVD-RAM, which can store a large quantity of high-quality video and audio data. Currently, such discs are widely commercially available.

FIG. 1 is a schematic diagram of a related art optical disc recorder system adapted to record data on an above-mentioned DVD-RAM. As shown in FIG. 1, the related art optical disc recorder system 100 includes an optical pickup 11, a video disc recorder (VDR) unit 12, and an encoder 13. As shown in FIG. 2, the DVD-RAM 10 has a lead-in area (LIA), a data area, and a lead-out area (LOA).

Also, an inner spare area (ISA) and an outer spare area (OSA) may be assigned to leading and trailing ends of the data area. In some kinds of DVD-RAMs, spare areas may also be assigned to respective trailing ends of tracks in the data area.

In the optical disc recorder system 100 having the above-mentioned configuration, the VDR unit 12 encodes data, externally inputted thereto, into a signal suitable to be recorded, modulates the signal, and records the modulated signal on the DVD-RAM 10 in the unit of ECC blocks. When the VDR unit 12 detects a defect area in the data area of the DVD-RAM 10 during the recording operation, as shown in FIG. 2, it records the ECC-based data, which would have been recorded in the defect area, in a spare area of the DVD-RAM 10, for example, the ISA, in the form of replacement data.

FIG. 3 is a schematic diagram of a related art optical disc player system 200. As shown in FIG. 3, the optical disc player system 200 includes an optical pickup 21, a video disc player (VDP) unit 22, and a D/A converter 23. When the VDP unit 22 detects a defect area during an operation of reproducing data recorded in the data area of the DVD-RAM 10, it performs sequential operations S10 to S15, as shown in FIG. 4, for searching for the replacement data recorded in a spare area of the DVD-RAM 10, and reproduces the searched data in place of the defect area, as shown in FIG. 4.

Accordingly, when there is a defect area in the data area of the DVD-RAM, it is possible to prevent erroneous data recording and reproducing operations by recording data, corresponding to data recorded on the defect area or to be recorded in the defect area, on a spare area of the DVD-RAM as replacement data, and reproducing the replacement data recorded on the spare area.

However, when the spare areas of the DVD-RAM are searched, as described above, in response to detection of a defect area during reproduction of data recorded in the data area of the DVD-RAM, the data reading operation for the reproduction of the data is delayed for a certain time. For this reason, it is impossible to continuously output reproduced pictures.

SUMMARY OF THE INVENTION

An object of the invention is to solve at least the above problems and/or disadvantages and to provide at least the advantages described hereinafter.

To achieve these objects, and other advantages and in accordance with the purpose of the invention as embodied and briefly described herein, there is provided a method for reproducing replacement data recorded on a spare area assigned to a disc, comprising reading replacement data from a spare area of the disc, storing the read replacement data, detecting a defect area while reproducing data recorded in a data area of the disc, and if there is a defect area detected, then reproducing at least a part of the stored replacement data corresponding to the detected defect area.

To further achieve these objects, and other advantages and in accordance with the purpose of the invention as embodied and briefly described herein, there is provided an apparatus for reproducing replacement data recorded on a spare area assigned to a disc, comprising means for reading the replacement data from the spare area of the disc, means for storing the read replacement data, means for detecting a defect area while reproducing data recorded in a data area of the disc, and means for reproducing, if there is a defect area detected, at least a part of the stored replacement data corresponding to the detected defect area.

To further achieve these objects, and other advantages and in accordance with the purpose of the invention as embodied and briefly described herein, there is provided a disc player system capable of reproducing replacement data recorded on a spare area assigned to a disc, comprising a memory, a pickup head configured to read a disc, wherein the pickup head reads and stores the read replacement data in the memory, a disc player unit configured to detect a defect area while reproducing data recorded in a data area of the disc, wherein if there is a defect area detected, then the disc player system reproduces at least a part of the stored replacement data corresponding to the detected defect area.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
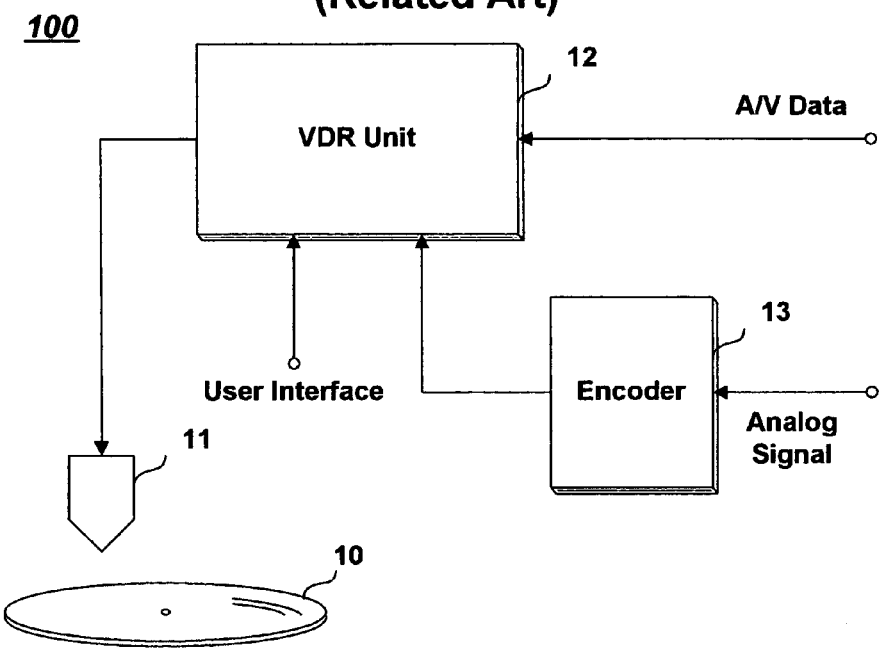
FIG. 1 is a schematic diagram of a related art optical disc recorder system.
Figure 2:
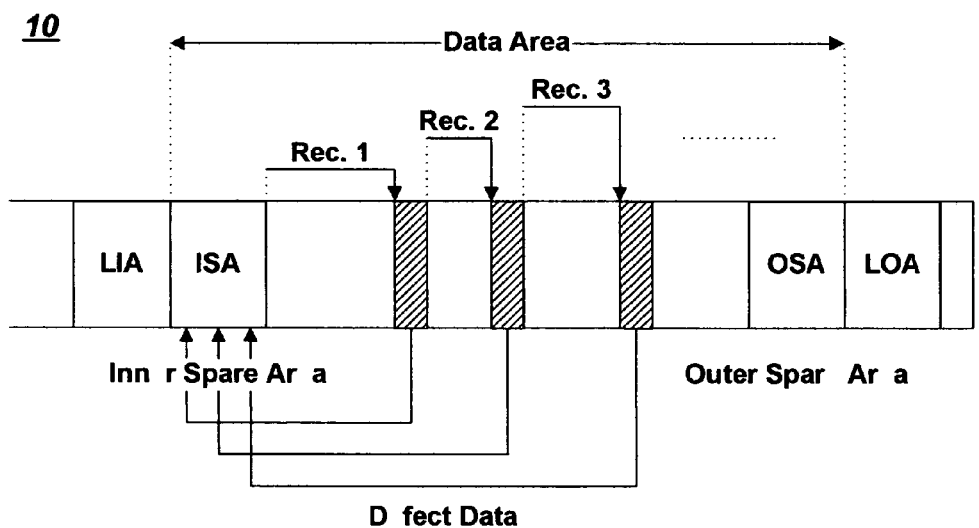
FIG. 2 is a schematic diagram illustrating a procedure for recording replacement data associated with a defect area on an optical disc in a related art optical disc recorder system.

Now, a method and apparatus for reproducing replacement data recorded on a disc according to embodiments of the invention will be described with reference to the annexed drawings, in which like reference numerals have been used to designate like elements.

The apparatus and method for reproducing replacement data recorded on an optical disc according to an embodiment of the invention may, for example, be implemented in an optical disc player system. Although this implementation is discussed in the present application, the invention is not so limited. It is respectfully submitted that the invention may also be implemented, for example, in a disc driver used as a peripheral device for a PC and connected to a PC, a CD player, such as a CD-DA, CD-R/RW, CD-MRW, a DVD player, such as a DVD-P, DVD-R/RW, DVD+R/RW, DVD-RA/W, DVD-RA, and a high capacity player, such as a Blue disc (BD) or other advanced optical disc player.

Figure 3:
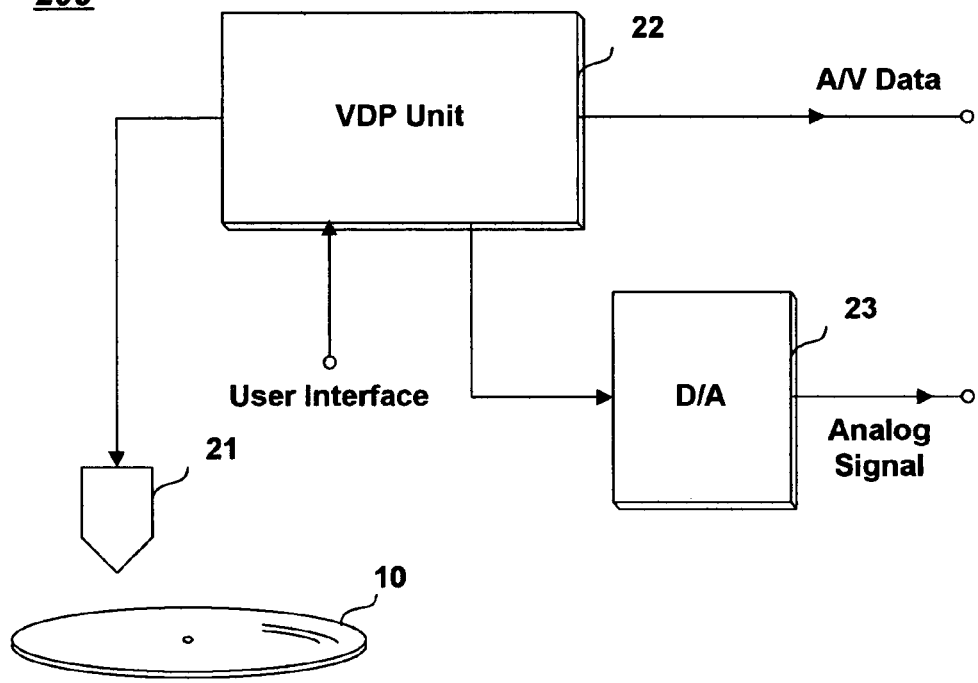
FIG. 3 is a schematic diagram of a related art optical disc player system.
Figure 4:
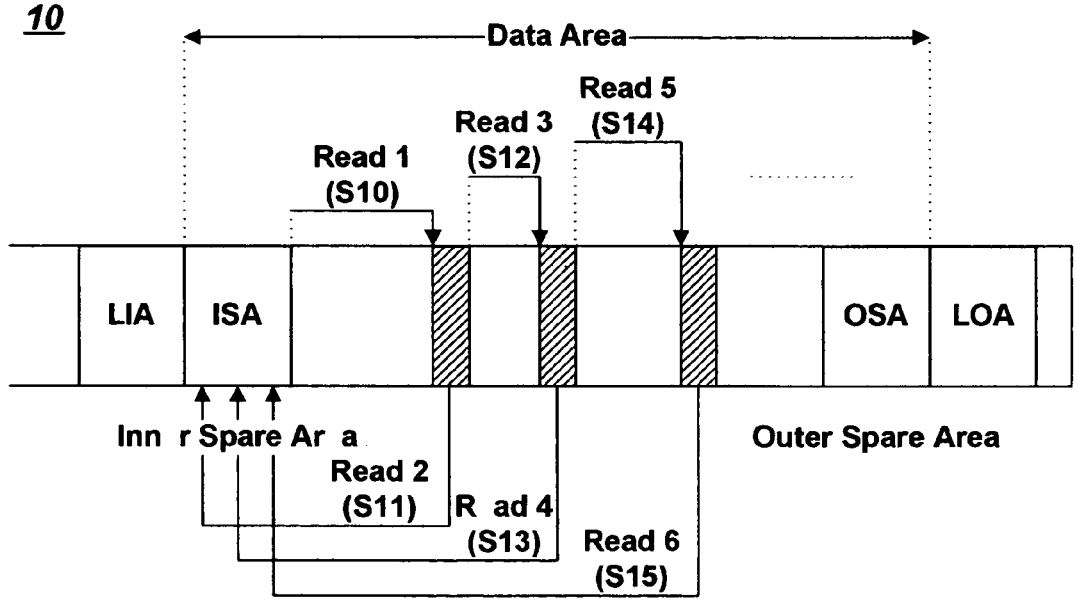
FIG. 4 is a schematic diagram illustrating a procedure of reproducing replacement data recorded on an optical disc in association with a defect area in a related art optical disc player.
Figure 5:
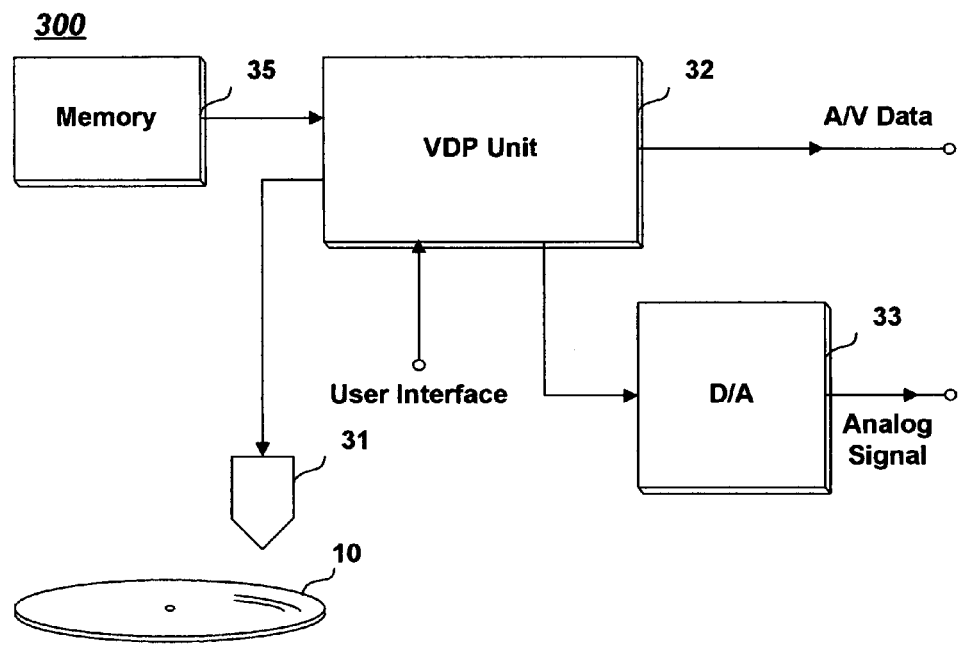
FIG. 5 is a schematic diagram of an optical disc player system according to an embodiment of the invention.
Figure 6:
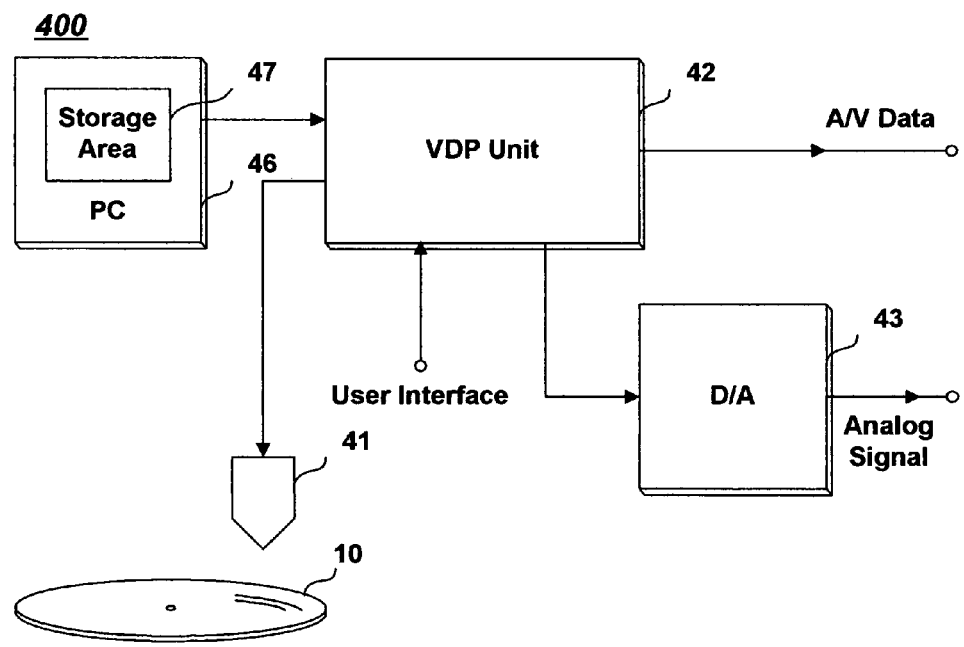
FIG. 6 is a schematic diagram of an optical disc player system according to another embodiment of the invention.

The optical disc player systems of FIGS. 5 and 6 are similar to the optical disc player system of FIG. 3. Like elements have been indicated with like reference numbers. FIG. 5 is a schematic diagram of an optical disc player system according to an embodiment of the invention. The optical disc player system 300 of FIG. 5 includes an optical pickup 31, a VDP unit 32, and a D/A converter 33. The optical disc player system 300 further includes a memory 35. The optical disc player system 400 of FIG. 6 includes an optical pickup 41, a VDP unit 42, and a D/A converter 43. The optical video disc player system 400 further includes a storage device 47 provided, for example, as part of a PC 46 with which the video disc player system 400 communicates.

The methods according to embodiments of the invention will now be described with reference to the apparatus set forth in FIGS. 5 and 6. However, it is understood that other apparatus may be used to practice the methods of the invention.

Figure 7:
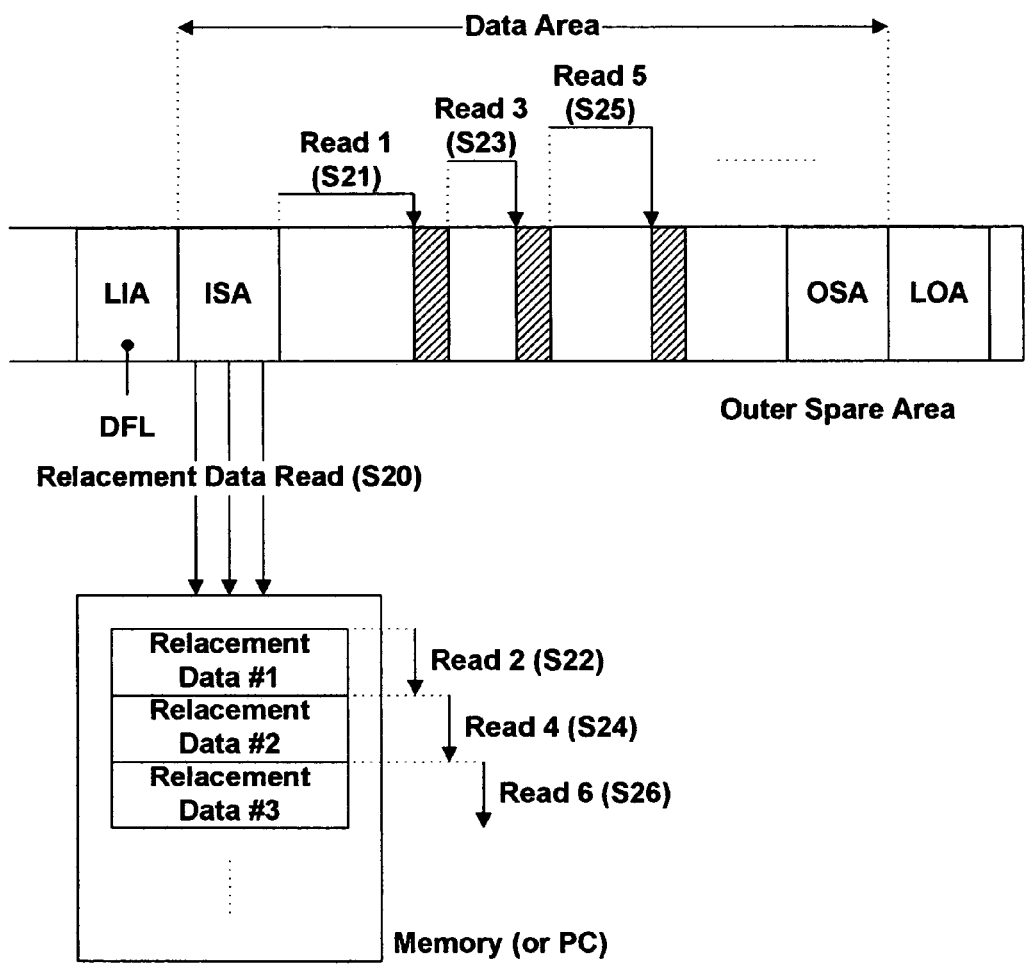
FIG. 7 is a schematic diagram illustrating a method for reproducing replacement data recorded on an optical disc in accordance with an embodiment of the invention.

FIG. 7 illustrates a method for reproducing replacement data recorded on an optical disc in accordance with an embodiment of the invention.

Referring to FIG. 7, the VDP unit 32 of the optical disc player system 300 retrieves a defect list (DFL) recorded in a LIA of a DVD-RAM 10 when the DVD-RAM 10 is loaded in the optical disc player system 300. Based on the retrieved DFL, the DVP unit 32 searches spare areas assigned to the data area of the DVD-RAM 10, reads replacement data recorded in the ISA of the DVD-RAM 10, and then temporarily stores the read replacement data in a memory 35 equipped in the optical disc player system, step S20.

Alternatively, the replacement data read from the spare area may be transmitted to a PC 46 so that it is temporarily stored in a storage device 47, for example, a RAM, equipped in the PC 46, as shown in FIG. 6. For the storage of the replacement data, a small quantity of memory can be used because the replacement data is relatively small.

Meanwhile, when the user requests a data reproducing operation for the DVD-RAM 10 under the condition in which the replacement data recorded on the DVD-RAM 10 has been temporarily stored in the optical disc player system or PC, the VDP unit 32 performs operations of sequentially reading and reproducing data normally recorded in the data area, step S21.

When the VDP unit 32 detects a defect area during the data reproducing operation, that is, when the current reproduction position corresponds to defect area position information included in the DFL information, it reads the replacement data temporarily stored in the memory of the optical disc player system 300 (or receives the replacement data temporarily stored in a RAM of a PC) without moving the optical pickup 31, and then reproduces the read or received replacement data, in step S22.

Accordingly, it is possible to rapidly read and reproduce the replacement data temporarily stored in the memory of the optical disc player system 300 (or in a RAM of a PC), thereby reproducing the replacement data along with the normally recorded data in a successive manner. The VDP unit 32 repeatedly performs the above operations in a sequential manner until there is a request for terminating the data reproduction, in steps S23 to S25.

Figure 8:
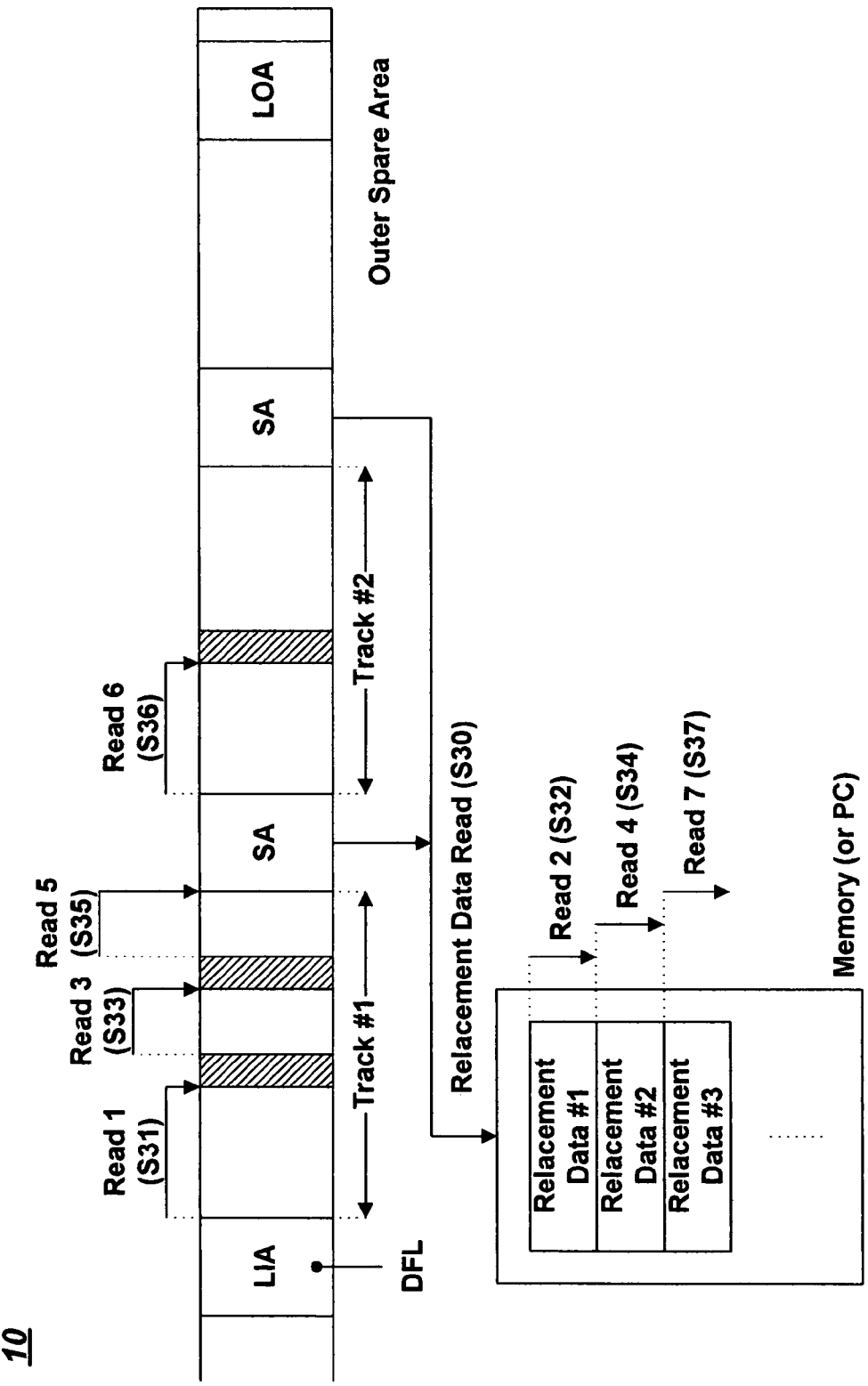
FIG. 8 is a schematic diagram illustrating a method for reproducing replacement data recorded on an optical disc in accordance with another embodiment of the invention.

FIG. 8 illustrates a method for reproducing replacement data recorded on an optical disc in accordance with another embodiment of the invention.

When the DVD-RAM 10 is loaded in the optical disc player system 300, the VDP unit 32 of the optical disc player system 300 searches spare areas assigned to the data area of the DVD-RAM 10, for example, a plurality of spare areas (SAs) assigned to respective trailing ends of tracks in the data area, as shown in FIG. 8, by referring to a defect list (DFL) recorded in the LIA of the DVD-RAM 10.

The VDP unit 32 then reads replacement data recorded in the SA of each track, and temporality stores the read replacement data in the memory equipped in the optical disc player system 300, in step S30. Alternatively, the read replacement data may be transmitted to a PC so that it is temporarily stored in a RAM equipped in the PC.

Meanwhile, when the user requests a data reproducing operation for the DVD-RAM 10 under the condition in which the replacement data recorded on the DVD-RAM 10 has been temporarily stored in the optical disc player system 300 (or PC), the VDP unit 32 performs operations of sequentially reading and reproducing data normally recorded on the data area, in step S31.

When the VDP unit 32 detects a defect area during the data reproducing operation, it reads the replacement data temporarily stored in the memory 35 of the optical disc player system 300 (or receives the replacement data temporarily stored in a RAM of a PC) without moving the optical pickup 31 to an associated spare area, and then reproduces the read or received replacement data, in step S32.

Accordingly, it is possible to rapidly read and reproduce the replacement data temporarily stored in the memory of the optical disc player system 300 (or in a RAM of a PC) without moving the optical pickup 31 to an associated spare area, thereby reproducing the replacement data along with the normally recorded data in a successive manner. The VDP unit 32 repeatedly performs the above operations in a sequential manner until there is a request for terminating the data reproduction, in steps S33 to S35.

On the other hand, only the replacement data associated with a particular program desired to be played back by the user may be selectively temporarily stored after being selected from the spare areas of the DVD-RAM. Generally, a plurality of programs or titles may be recorded on a recording medium such as DVD-RAM. When a defect area is detected from the data area of such a DVD-RAM during an operation of recording a plurality of programs or titles on the DVD-RAM, replacement data associated with the detected defect area is stored in a spare area without any storage of information about the program or tide associated with the detected defect area. However, when one of the programs or titles recorded on the DVD-RAM is selected for playing back thereof, it is possible to read only the replacement data recorded on the spare area in association with the selected program or tide so that only the read replacement data is temporarily stored. Accordingly, the capacity of the memory adapted to temporarily store replacement data can be reduced.

That is, it is possible to search the DFL for a replacement data item associated with the particular program or tide by comparing the start or end address of the particular program or title included in navigation data with defect area addresses recorded in respective replacement data items of the DFL. Thus, the replacement data of the spare area corresponding to the searched replacement data item can be read and stored in the memory.

Generally, optical disc players frequently employ a memory having a small capacity in order to achieve cost reduction. Where the invention is applied to such an optical disc player, only a part of replacement data corresponding to the capacity of the memory is read from the associated spare area of an optical disc, and then temporarily stored in the memory. The temporarily stored replacement data part is then reproduced along with data normally recorded on the optical disc. After completion of the replacement data part, a part of the remaining replacement data corresponding to the capacity of the memory while following the reproduced replacement data part is read, and then temporarily stored in the memory so that it is subsequently reproduced along with the normally-recorded data. In such a manner, the reproduction of the replacement data along with the normally recorded data is repeated by the unit of its parts each corresponding to the capacity of the memory.

As previously stated, the invention is applicable to various diverse types of discs, including optical discs, to which defect management is applicable, in addition to DVD-RAM.

As is apparent from the above description, the invention provides a method for reproducing replacement data recorded on a disc, which can efficiently prevent reproduced pictures from being discontinuously outputted due to a delayed data reading operation caused by a searching operation for a spare area in which the replacement data is recorded.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for reproducing replacement data recorded on a spare area assigned to a disc, comprising:
    reading replacement data from a spare area of the disc;
    storing the read replacement data;
    detecting a defect area while reproducing data recorded in a data area of the disc; and
    if there is a defect area detected, then reproducing at least a part of the stored replacement data corresponding to the detected defect area.

2. The method according to claim 1, wherein the disc comprises an optical disc.

3. The method according to claim 1, wherein reading the replacement data from the spare area of the disc and storing the read replacement data comprises:
    searching the spare area for replacement data;
    reading the searched replacement data recorded on the spare area; and
    storing the read replacement data in a memory.

4. The method according to claim 1, wherein reading the replacement data from the spare area of the disc and storing the read replacement data comprises:
    searching the spare area for replacement data;
    reading the searched replacement data recorded on the spare area; and
    storing the read replacement data in a storage device.

5. The method according to claim 1, wherein detecting a defect area is carried out, based on defect list information.

6. The method according to claim 5, wherein the defect list information is recorded in a lead-in area of the disc.

7. The method according to claim 1, wherein reading replacement data from a spare area of the disc and storing the read replacement data comprises:
    identifying a predetermined position of a program requested to be played back;
    reading a part of the replacement data recorded in the spare area, based on the identified predetermined position; and
    storing the read replacement data part.

8. The method according to claim 7, wherein the predetermined position of the program corresponds to a start or end address of the program included in navigation data.

9. The method according to claim 8, wherein the replacement data part to be read and stored is selected by comparing the start or end address of the program with defect area addresses respectively recorded in replacement data items included in defect list information, thereby searching for the replacement data item having the defect area address corresponding to the start or end address.

10. The method according to claim 1, wherein reading replacement data from a spare area of the disc and storing the read replacement data, comprises:
    reading a part of the replacement data corresponding to the capacity of a memory when the replacement data has a size exceeding the capacity of the memory, and storing the read replacement data part.

11. The method according to claim 10, wherein reproducing at least a part of the stored replacement data corresponding to the detected defect area comprises reproducing data recorded in a data area of the disc while reproducing a part of the replacement data corresponding to the part of the replacement data currently stored in the memory.

12. The method according to claim 11, wherein the method further comprises:
    reading a next part of the replacement data, recorded in the spare area;
    storing the read next replacement data part in the memory; and
    reproducing an un-reproduced part of the recorded data following the reproduced part of the recorded data while reproducing at least a part of the next replacement data, stored in the memory, corresponding to a defect area detected during the reproduction of the un-reproduced part of the recorded data.

13. Apparatus for reproducing replacement data recorded on a spare area assigned to a disc, comprising:

means for reading the replacement data from the spare area of the disc;

means for storing the read replacement data;

means for detecting a defect area while reproducing data recorded in a data area of the disc; and means for reproducing, if there is a defect area detected, at least a part of the stored replacement data corresponding to the detected defect area.

14. A disc player system capable of reproducing replacement data recorded on a spare area assigned to a disc, comprising:

a memory;

a pickup head configured to read a disc, wherein the pickup head reads and stores the read replacement data in the memory;

a disc player unit configured to detect a defect area while reproducing data recorded in a data area of the disc, wherein if there is a defect area detected, then the disc player system reproduces at least a part of the stored replacement data corresponding to the detected defect area.

15. The disc player system according to claim 14, wherein the disc comprises an optical disc.

16. The disc player system according to claim 14, wherein the disc player unit is further configured to search the spare area for replacement data when the disc is loaded into the disc player, read the searched replacement data recorded on the spare area, and store the read replacement data in the memory.

17. The disc player system according to claim 14, wherein the memory comprises a storage device in a PC.

18. The disc player system according to claim 14, wherein the detection of the defect area is carried out, based on defect list information.

19. The disc player system according to claim 18, wherein the defect list information is recorded in a lead-in area of the disc.

20. The disc player system according to claim 14, wherein the disc player unit is further configured to identify a predetermined position of a program requested to be played back, read a part of the replacement data recorded in the spare area, based on the identified predetermined position, and store the read replacement data part in the memory.

21. The disc player system according to claim 20, wherein the predetermined position of the program corresponds to a start or end address of the program included in navigation data.

22. The disc player system according to claim 21, wherein the replacement data part to be read and stored is selected by comparing the start or end address of the program with defect area addresses respectively recorded in replacement data items included in defect list information, thereby searching for the replacement data item having the defect area address corresponding to the start or end address.

23. The disc player system according to claim 14, wherein the disc player unit is further configured to read a part of the replacement data corresponding to the capacity of the memory when the replacement data has a size exceeding the capacity of the memory, and store the read replacement data part.

24. The disc player system according to claim 23, wherein the disc player unit is further configured to reproduce data recorded in a data area of the disc while reproducing a part of the replacement data corresponding to the part of the replacement data currently stored in the memory.

25. The disc player system according to claim 24, wherein the disc player unit is further configured to read a next part of the replacement data, recorded in the spare area store the read next replacement data part in the memory, and reproduce an un-reproduced part of the recorded data following the reproduced part of the recorded data while reproducing at least a part of the next replacement data, stored in the memory, corresponding to a defect area detected during the reproduction of the un-reproduced part of the recorded data.

* * * * *